(No Model.) 4 Sheets—Sheet 1.
H. P. FEISTER.
BUTTON HOLE BARRING MACHINE.
No. 451,000. Patented Apr. 21, 1891.
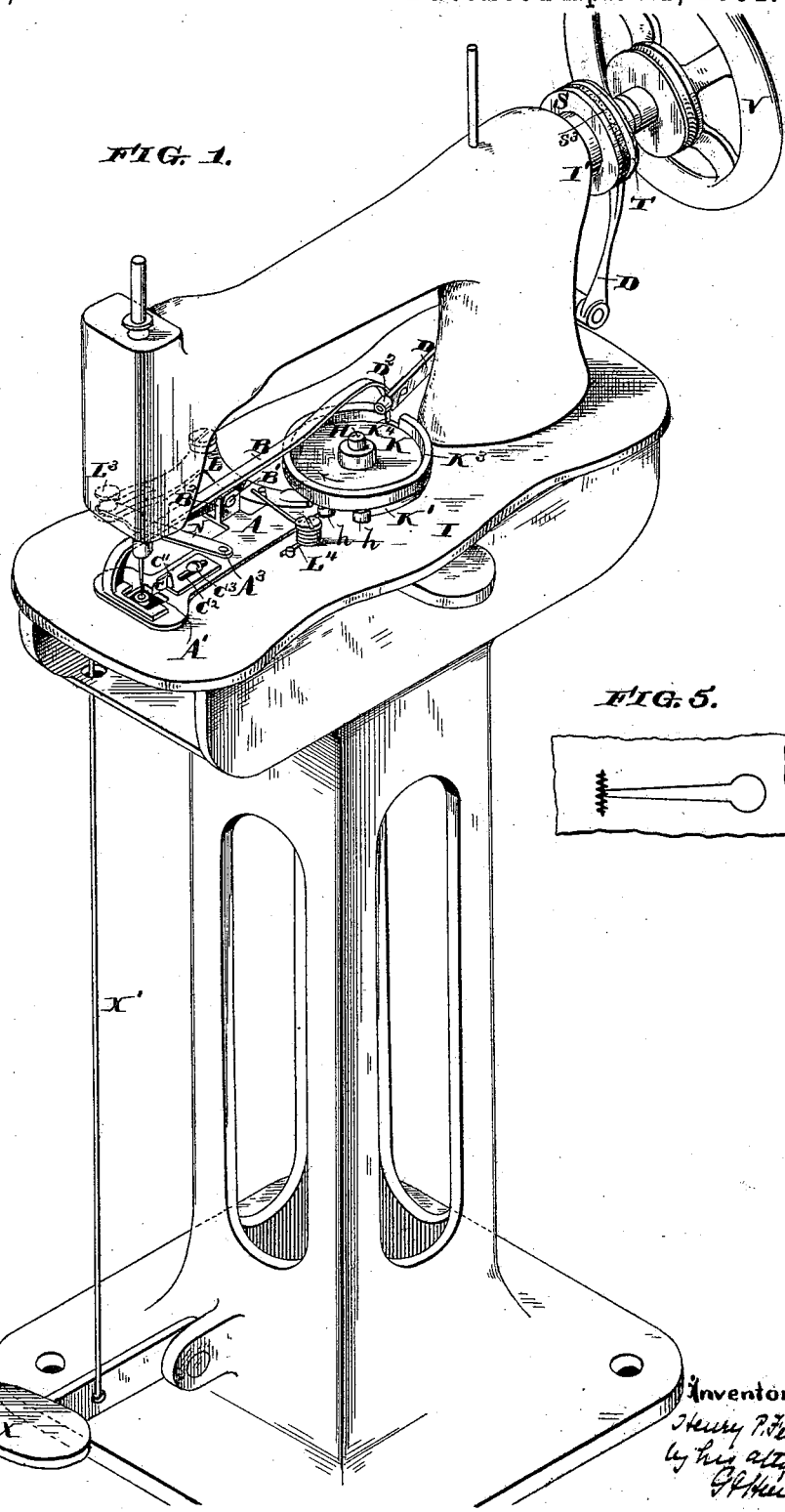

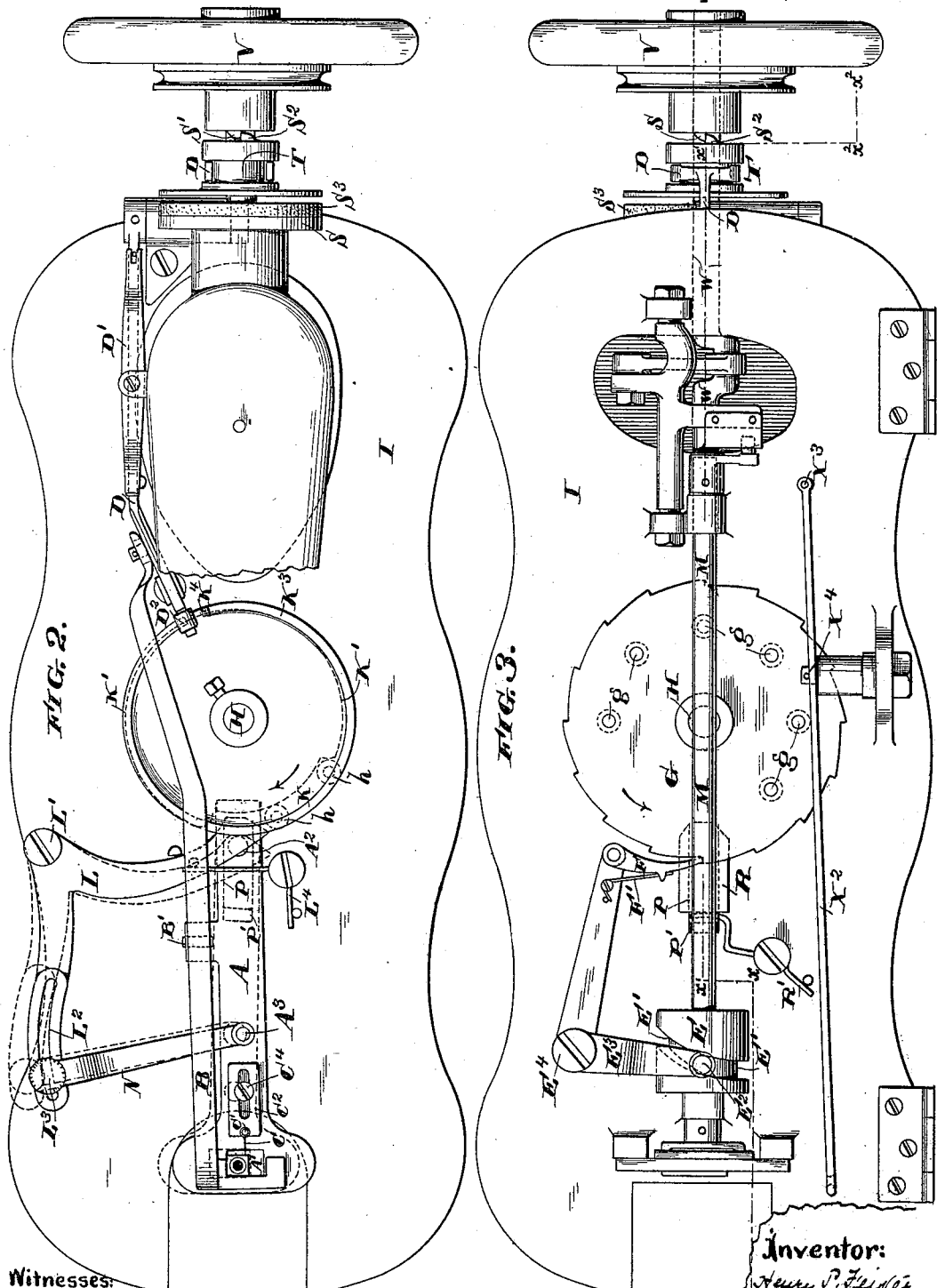

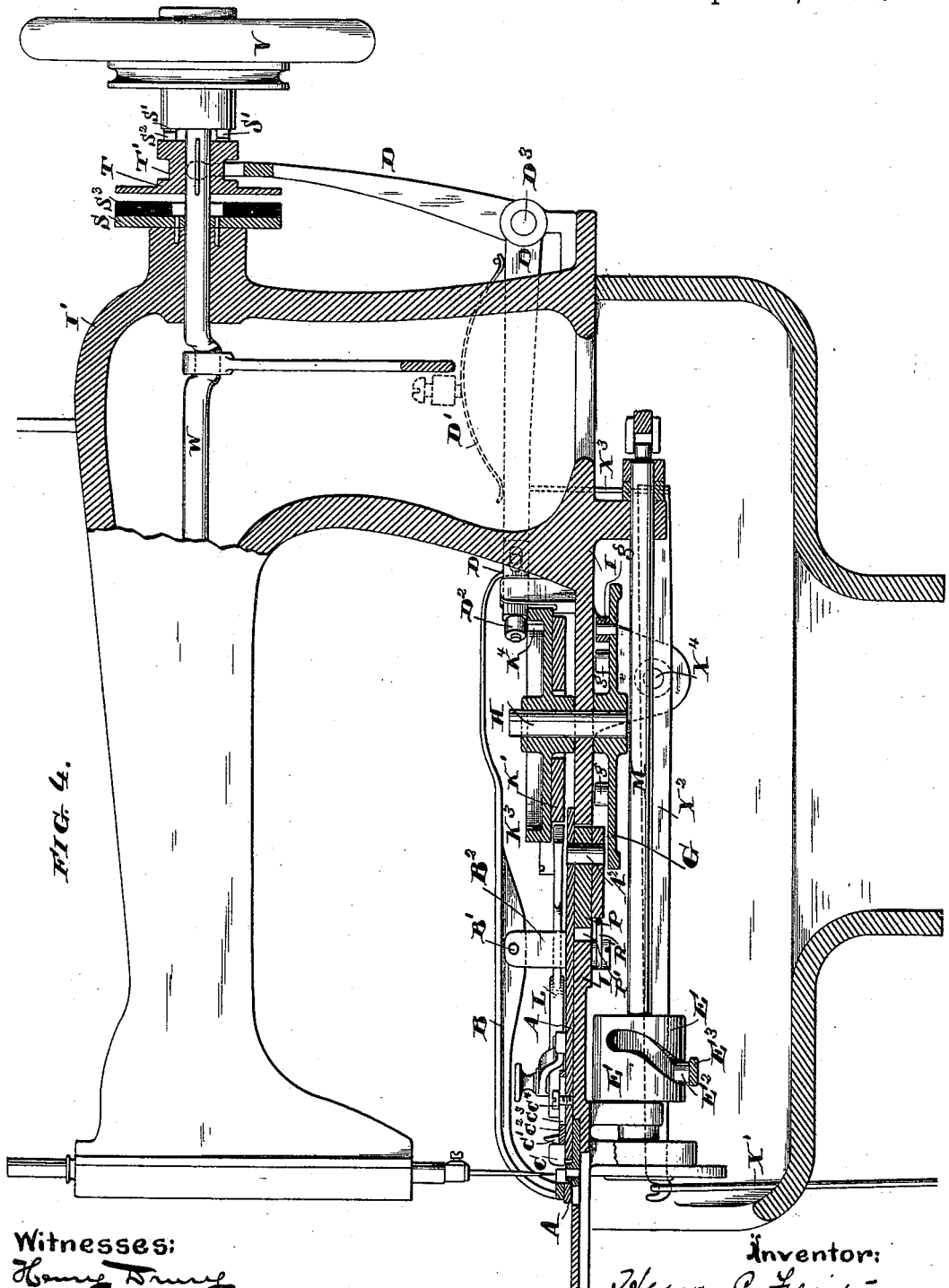

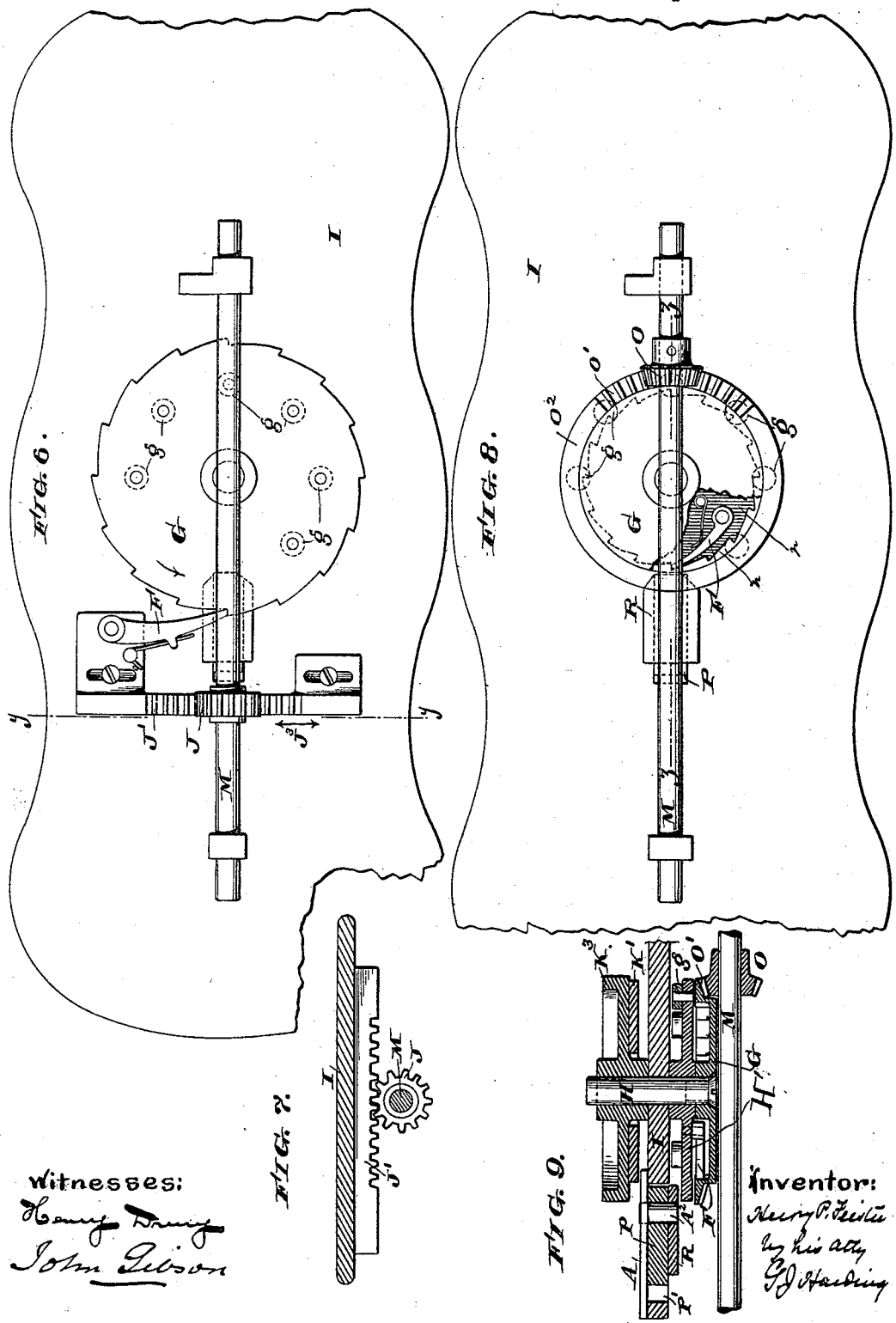

UNITED STATES PATENT OFFICE.

HENRY P. FEISTER, OF PHILADELPHIA, PENNSYLVANIA, ASSIGNOR TO THE ESSINGTON BUTTONHOLE FINISHING MACHINE COMPANY, OF NEW JERSEY.

BUTTON-HOLE-BARRING MACHINE.

SPECIFICATION forming part of Letters Patent No. 451,000, dated April 21, 1891.

Application filed January 14, 1890. Serial No. 336,894. (No model.)

*To all whom it may concern:*

Be it known that I, HENRY P. FEISTER, a citizen of the United States, residing at Philadelphia, county of Philadelphia, and State of Pennsylvania, have invented a new and useful Improvement in Button-Hole-Barring Machines, of which the following is a full, clear, and exact description, reference being had to the accompanying drawings, which form a part of this specification.

In the drawings, Figure 1 is a perspective view of the machine and stand complete, showing treadle for starting, certain parts being broken away. Fig. 2 is a plan view of the mechanism above the table or bed-plate, looking down from above. Fig. 3 is a plan view of the mechanism beneath the table or bed-plate of the machine, looking up from beneath. Fig. 4 is a sectional view of the machine along the lines $x\,x$, $x'\,x'$, $x^2\,x^2$ of Fig. 3. Fig. 5 represents a button-hole with a bar across the end complete, showing stitches somewhat enlarged. Fig. 6 shows a modification of the device shown in Fig. 3. Fig. 7 is a sectional view of parts of the said modification along the line $y\,y$ of Fig. 6. Fig. 8 shows another modification of the device shown in Fig. 3. Fig. 9 is a sectional view of parts of said modification along the line $z\,z$ of Fig. 8.

My invention consists of a machine for finishing button-holes embodying means for holding securely and guiding and automatically clamping and releasing the material containing the worked button-hole in such a manner that the needle and thread of the sewing-machine will stitch a substantial bar across the unfinished end of the button-hole. This bar as made on my machine is formed of a series of transverse stitches laid one on top of the other at right angles to the length of the button-hole, which series of long transverse stitches is afterward overseamed by a number of short stitches crossing the transverse stitches side by side and very close together. As the long stitches are laid at right angles to both the length of the button-hole and the bed-plate of the machine, I call them "long transverse stitches," and as the short stitches are laid in the same direction as both the length of the button-hole and bed-plate of the machine I call them "short longitudinal stitches." The formation of this combination of stitches is accomplished by having the cloth or other material to be operated upon shifted under the needle-point between each descent of the needle in its stitch-forming operations. This shifting of the goods I accomplish by having a carrier A go through the necessary operations and by clamping the goods fast to said carrier by means of an automatic clamp B. This carrier A is a flat piece of metal pivoted at one end by the stud $A^2$, Fig. 4, to the sliding block P, which slides lengthwise in the slot P', cut in the table or bed-plate I of the machine. By this arrangement the carrier A is susceptible of being oscillated transversely on its pivot $A^2$ or of being vibrated longitudinally on the bed-plate I by reason of its connection with said slide-block P. Hence I term my carrier a "vibrating" and "oscillating" carrier. These separate movements may be made independently or both together, and in forming my bar I first cause the carrier to oscillate transversely to form the long transverse stitches which constitute the bed or foundation of the bar. I then cause the carrier to vibrate longitudinally, thus forming the short longitudinal stitches, which overseam the long transverse ones just made, and at the same time I cause my carrier to slowly move transversely, so that the short overseaming stitches will not be in one place, but evenly distributed along the long under stitches side by side and close together.

At the opposite end of the carrier A from the pivot $A^2$ is the throat A', Fig. 2, or opening through which the needle passes in sewing. In order to properly locate the material in the first instance and to more firmly secure it during the after operation of sewing the bar, I place on the carrier an adjustable guide. This adjustable guide is a metal projection somewhat similar in shape to a button-hole, consisting of a blade C, Figs. 1, 2, and 4, and a post C', over which the button-hole is slipped. This post C' is mounted on a flat piece of metal $C^2$, provided with a slot $C^3$ for adjusting, through which slot passes a screw C⁴, entering the carrier A, and thus securing the post to the carrier at any desired distance from the blade C. The clamp B is pivoted at B' to the standard B² on the carrier A, and is further extended to connect by a joint adapted to allow the free play of the guide when operating both ways with the carrier A to the elbow-lever D, so that when the latter is depressed by the spring D' the clamping end of the clamp B over the carrier A will be elevated, thus automatically releasing the goods.

The mechanism for imparting to the cloth-carrier the necessary movements is actuated directly from the intermittently-driven shuttle-shaft M of the sewing-machine. I do this by pinning to the shuttle-shaft M of the machine a suitable cam or gearing, which actuates a pawl and ratchet-wheel in connection with the shaft H, which shaft I will denote the "carrier-actuating shaft." In the first modification of this device, as shown in Fig. 3, I have a cam E, pinned to the shuttle-shaft M, and provided with a properly curved slot E', entered by and guiding the roller E², carried at one end of one of the arms of the elbow-lever E³. This elbow-lever E³ is pivoted to the bed I by the stud E⁴ and carries on the end of its other arm the pawl F, held in operative position by the spring F'. The pawl F engages with the ratchets on the periphery of the ratchet-wheel G, mounted on the carrier-actuating shaft H, which shaft is journaled in the bed-plate or table I, and carries the mechanism for directly operating the carrier. In this modification the movements of the shuttle-shaft M (which movement is an element of the original sewing-machine) causes the cam E to turn, by which turning the curved slot E' forces the elbow-lever E³ to swing on the pivot E⁴, and thus carry the pawl F, secured to the elbow-lever E³, backward and forward over the periphery of the ratchet-wheel G, whereby a ratchet is engaged and said wheel and the shaft H on which it is mounted is rotated step by step. This modification may be employed on machines which have either a vibrating or revolving shuttle-shaft, the cam in either case being timed to cause the lever E³ to vibrate. The device is so timed that at every vibration or revolution of the shuttle-shaft M the pawl F drops back one ratchet and engages therewith and returns, carrying the ratchet-wheel G and the shaft H one step around. By this means the shaft H, carrying the mechanism for shifting the carrier A, is given an intermittent rotary motion. The same timing is used in both of my other modifications about to be described and with similar effect to the shaft H. The device is also so timed that the ratchet-wheel G and shaft H can never operate while the needle is down in the material. Hence the carrier A, which is solely dependent upon the shaft H for its motive power, can never shift while the needle is in the goods. In my second modification of the device for actuating the shaft H, I pin to the shuttle-shaft M a gear-wheel J, Figs. 6 and 7, working in the rack J', suitably hung from the bed-plate I to allow a sliding movement in the direction of the double-headed arrow J³ from side to side. This rack is provided with a pawl F, which engages with the ratchet-wheel G, as in the former modification, with exactly the same result. In my third modification of the device for actuating the shaft H from the shuttle-shaft M, I pin to the shuttle-shaft M a bevel gear-wheel O, which operates in a curved rack O', occupying a segment of the ratchet-wheel O², (which is mounted loosely on the shaft H,) carrying the internal ratchets $r$ $r$ $r$, Figs. 8 and 9, which engage with the pawl F. This pawl F is mounted on a disk H', which is fast to the shaft H. Hence each step-by-step movement of the disk carrying the engaging-pawl F is imparted to the shaft H. In each of these two last-described modifications the vibratory movements of the shuttle-shaft M turn the gear-wheel J in Figs. 6 and 7 and O in Figs. 8 and 9 back and forth, which in turn imparts a forward and backward and back movement to a vibrating rack, (J' in Figs. 6 and 7 and O' in Figs. 8 and 9,) with which in each case the gear-wheel is engaged. In each case, also, the ratchet-and-pawl movement is operated by the rack with a result similar—i. e., the imparting of an intermittent rotary motion to the shaft H.

Having shown my device for imparting to the shaft H an intermittent rotary motion from the shuttle-shaft M, I shall now describe how the proper movements are given to the carrier A by the intermittent rotation of the shaft H.

On the shaft H, Figs. 1, 2, and 4, I fasten above the bed-plate or table I a disk K, carrying on its under face two or more (according to the number of long transverse stitches intended to be made) small rollers $h$ $h$, projecting downward. Each roller as the disk K rotates is brought around so as to bear against one end of the elbow-lever L, which is pivoted to the bed-plate I by the stud L'. This elbow-lever L is provided with an arc-shaped slot L² on its other arm, which slot is entered by a thumb-screw L³, passing through the link N, which is pivoted to the carrier A by the stud A³. The object of this slot L² and swinging link N is to provide a means for adjusting the length of the oscillations of the carrier, and consequently regulating the length of the bar, as well as to connect the elbow-lever with the carrier A. As the disk K revolves, the rollers $h$ $h$ in turn bear against and force the lever L outward, thus moving the carrier A, as shown in the dotted lines on Fig. 2, sidewise on its pivot A². After the passage of the roller the elbow-lever L is forced back to its former position by the spring L⁴, by which means the carrier A is also moved sidewise in the opposite direction to its last move, and back to its former position. The next roller then coming into operation and acting as the first one again causes the carrier A to move sidewise once more, and so on, which to-and-fro movement of the carrier A constitutes the oscillation necessary to make the long transverse stitches. It is by this means that the goods clamped to the carrier A are shifted between each downward stroke of the needle from side to side, and the long transverse stitches forming the bed or foundation of the bar are laid at right angles to the length of the button-hole.

A similar device, Fig. 3, placed under the table or bed-plate I of the machine is used to impart to the carrier the short longitudinal movement whereby the short overseaming-stitches are made. To a disk, or preferably to the ratchet-wheel G, when the first or second modifications of my actuating device before described is used, or to the disk H', Figs. 8 and 9, when my third modification is used, I fasten on the upper face a number of small upright rollers $g$ $g$ $g$, &c., (according to the number of overseaming-stitches intended to be laid,) similar to the rollers $h$ $h$. These rollers $g$ $g$ $g$, as the shaft H rotates, one by one bear on the face of the block R, which is fastened securely to the sliding block P, to which, as already described, the carrier A is pivoted. Therefore the block R is susceptible of being vibrated longitudinally, and every movement of the block R is communicated to the carrier A. As the ratchet-wheel G in the first and second modifications or the disk H' in the third modification revolves, the rollers $g$ $g$ $g$ come into play and one by one force back the block R, which between the passage of each roller is returned to its normal position in the path of said rollers by the action of the spring R', which is pinned to the bedplate of the machine. In this manner the transverse vibratory movement is imparted to the carrier A, and hence to the goods clamped thereon. I have so arranged these separate sets of rollers that but one set shall operate at one time, the upper set giving the long transverse stitches first, the lower set afterward operating the carrier to form the overseaming stitches on top of the transverse ones.

Now it will be observed that in the formation of the short overseaming stitches, they would all be in the same place—that is, one on top of the other, the same as the long stitches—unless some means were used to move the carrier slowly sidewise while its short longitudinal movements are being effected. This I accomplish by means of a cam K'. (Shown by the dotted lines on Fig. 2, and in section on Fig. 4.) This cam I place on the lower side, projecting downward, of the disk K, and it is so shaped that its effect on the elbow-lever L will be to slowly force it back while the lower set of rollers $g$ $g$ $g$ is giving the short longitudinal vibratory motion to the carrier A. This forcing back of the lever L of course has the effect of drawing the carrier in the desired sidewise direction while vibrating lengthwise, and the overseaming stitches being formed by the needle, are properly and evenly distributed along the long transverse stitches.

I will now describe my device for automatically stopping the machine at the completion of each bar. On the main driving-shaft W, Fig. 4, of the machine is hung loosely a belt and fly wheel V, having a number of projections or lugs S' S', so placed as to couple with a corresponding number of similar projections or lugs $S^2$ $S^2$, carried by a clutch and brake-disk T, which I fasten to the main shaft W, so as to revolve with it, but also so as to slide loosely lengthwise along it for a limited distance to allow the two sets of lugs S' S' and $S^2$ $S^2$ to be coupled and uncoupled. The brake-disk T has also around it an encircling slot T', into which projects the upper end of the upright arm of the elbow-lever D, which lever is pivoted to a standard and bearings on the bed-plate I at $D^3$. I fasten to the upright part of the arm of the machine I' a friction-disk S, surrounding but entirely disconnected from the main shaft W. This disk is stationary and is faced with leather $S^3$, and is mounted at such a distance from the disk T that it will interfere with and be firmly pressed by the disk T at the very instant that the disk T is carried away from the belt and fly wheel V and the machine unclutched.

On the upper surface of the disk K is constructed a ledge projecting upward at right angles to the plane of the disk K. On this ledge, the roller $D^2$, at the end of the horizontal arm of the elbow-lever D, is kept firmly pressed by the spring D'. At a certain point calculated to act at the proper time to stop the machine at the completion of the bar on the projecting ledge $K^3$, I have an opening $K^4$, downward into which the roller $D^2$ is forced by the spring D' the instant that the same is presented by the intermittent rotation of the shaft H. This downward movement of the lever D causes its upright arm to slide the clutch and brake-disk away from the belt-wheel $D^5$ and toward the friction-disk S a sufficient distance to uncouple the two sets of projecting lugs S' S' and $S^2$ $S^2$, and to bring the brake-disk into contact with the leather face $S^3$ of the friction-disk S. By this device not only is the motive power completely cut off from the machine, but any possible momentum of the main shaft and dependent mechanism is immediately arrested by the forcible contact of the brake and friction disks. As before explained, the cloth is at the same time released from the pressure of the clamp, leaving it free to be taken out without effort on the part of the operator.

The machine is started by pressing the treadle X, Fig. 1, which draws down the rod X', Fig. 4, lowering one end of the lever $X^2$, fulcrumed at $X^4$ to a standard projecting downward from the upper side of the bed or table I. This depression of one end of lever X² elevates the opposite end, which, being connected by the rigid rod X³ to the horizontal arm of the elbow-lever D, elevates said elbow-lever, drawing the roller D² out of the slot K⁴ and coupling the lugs S' S' and S² S², whereby the machine is at once started to run until the slot K⁴ is once more presented to the roller D² by the intermittent rotation of the shaft H, which will not be until another bar has been worked complete.

The cloth is at the same instant that the machine is started automatically clamped into position fast to the carrier A by reason of the automatic extension-clamp B, connecting with the lever D, as before described.

Having now fully described my invention, what I claim as new, and desire to protect by Letters Patent, is—

1. In a button-hole-barring machine, in combination, a main driving-shaft, a shuttle-shaft intermittently driven by said main shaft, a carrier, and intermediate mechanism, substantially as described, between the shuttle-shaft and carrier, whereby the carrier is caused to move laterally and longitudinally by the movement of the shuttle-shaft.

2. In a button-hole-barring machine, in combination, a main driving-shaft, a shuttle-shaft intermittently driven by said main shaft, a carrier, a carrier-actuating shaft, intermediate mechanism, substantially as described, between the shuttle-shaft and the carrier-actuating shaft, and intermediate connections, substantially as described, between the carrier-actuating shaft and the carrier, whereby the shuttle-shaft causes the carrier to move laterally and longitudinally simultaneously.

3. In a button-hole-barring machine, in combination, a main driving-shaft, a shuttle-shaft intermittently driven by said main shaft, a carrier, intermediate mechanism, substantially as described, between the shuttle-shaft and the carrier, whereby the carrier is caused to move laterally, and mechanism, substantially as described, between the shuttle-shaft and carrier, whereby said carrier is given a combined longitudinal and lateral movement.

4. In a button-hole-barring machine, in combination, a carrier, a block on the under face of the machine, a slot in the bed-plate of the machine through which said block projects and in which it is adapted to move, said block being pivoted to said carrier, and means, substantially as described, above the bed-plate to cause said carrier to vibrate on its pivot-point, and means, substantially as described, below the bed-plate to cause said block and carrier to reciprocate.

5. In a button-hole-barring machine, in combination, a main driving-shaft, a shuttle-shaft intermittently driven by said main driving-shaft, a cam upon said shuttle-shaft; a lever, one end resting in said cam, a pawl secured to the other end of said lever, a carrier-actuating shaft, a ratchet-wheel on said shaft in which said pawl works, disks upon said carrier-actuating shaft, rollers on said disks, a carrier, and connection between said carrier and disks, substantially as described, whereby said carrier is caused to move laterally and longitudinally.

6. In a button-hole-barring machine, in combination, a main driving-shaft, a shuttle-shaft intermittently driven by said main driving-shaft, a cam upon said shuttle-shaft, a lever, one end resting in said cam, a pawl secured to the other end of said lever, a carrier-actuating shaft, a ratchet-wheel on said shaft in which said pawl works, disks upon said carrier-actuating shaft, rollers on said disks and a cam-surface on said disk, a carrier, and connection between said disks and said carrier, whereby said carrier is caused to move laterally and longitudinally and laterally simultaneously.

7. In a button-hole-barring machine, in combination, a carrier, a block to which said carrier is pivoted, a slot in the bed of the machine in which said block is adapted to move, a carrier-actuating shaft, disks upon said shaft, rollers equal in number to the longitudinal stitches desired upon said disk in the path of said block, a bell-crank lever, one end connected to said carrier, rollers equal in number to the lateral stitches desired upon said disk, the other end of said lever being in the line of movement of said rollers, a ratchet-wheel on said carrier-actuating shaft, a main driving-shaft, a shuttle-shaft intermittently driven by said main driving-shaft, a cam upon said shuttle-shaft, a bell-crank lever, one end resting in said cam, and a pawl which is secured to the other lever-arm, said pawl working in the ratchet-wheel on the carrier-actuating shaft.

8. In a button-hole-barring machine, in combination, a carrier, a block on the under face of the machine, a slot in the bed of the machine through which said block projects and in which it is adapted to move, said carrier being pivoted to said block, a carrier-actuating shaft, disks upon said shaft, rollers equal in number to the longitudinal stitches desired upon said disk in the path of said block, a spring against which said block works, a bell-crank lever, one end connected to said carrier, rollers equal in number to the lateral stitches desired upon said disk, the other end of said lever being in the line of movement of said rollers, a spring against which said lever works, a ratchet-wheel on said carrier-actuating shaft, a main driving-shaft, a shuttle-shaft intermittently driven by said main shaft, a cam upon said shuttle-shaft, a bell-crank lever, one end resting in said cam, and a pawl which is secured to the other lever-arm, said pawl working in the ratchet-wheel on the carrier-actuating shaft.

9. In a button-hole-barring machine, in combination, a carrier, a block on the under face of the machine, a slot in the bed of the machine through which said block projects and in which it is adapted to move, said carrier being pivoted to said block, a cloth-carrier-actuating shaft, disks upon said shaft, rollers equal in number to the longitudinal stitches desired upon said disk in the path of said block, a bell-crank lever, a rod connecting said lever and the carrier, rollers equal in number to the lateral stitches desired upon said disk, the other end of said lever being in the line of movement of said rollers, a ratchet-wheel on said carrier-actuating shaft, a main driving-shaft, a shuttle-shaft intermittently driven by said main shaft, a cam upon said shuttle-shaft, a bell-crank lever, one end resting in said cam, and a pawl which is secured to the other lever-arm, said pawl working in the ratchet-wheel on the carrier-actuating shaft.

10. In a button-hole-barring machine, in combination, a carrier, a block on the under face of the machine to which said carrier is pivoted, a slot in the bed of the machine through which said block projects and in which it is adapted to move, said carrier being pivoted to said block, a carrier-actuating shaft, disks upon said shaft, rollers equal in number to the longitudinal stitches desired upon said disk in the path of said block, a bell-crank lever, a rod, one end adjustably secured in said link, the other end secured to the carrier, rollers equal in number to the lateral stitches desired upon said disk, the other end of said lever being in the line of movement of said rollers, a ratchet-wheel on said carrier-actuating shaft, a main driving-shaft, a shuttle-shaft intermittently driven by said main driving-shaft, a cam upon said shuttle-shaft, a bell-crank lever, one end resting in said cam, and a pawl which is secured to the other lever-arm, said pawl working in the ratchet-wheel on the carrier-actuating shaft.

11. In a button-hole-barring machine, in combination, a carrier, a block on the under face of the machine, a slot in the bed of the machine through which said block projects and in which it is adapted to move, said carrier being pivoted to said block, a carrier-actuating shaft, disks upon said shaft, rollers equal in number to the longitudinal stitches desired upon said disk in the path of said block, a spring against which said block works, a bell-crank lever, a link in said lever, a rod, one end adjustably secured in said link, the other end secured to the carrier, rollers equal in number to the lateral stitches desired upon said disk, the other end of said lever being in the line of movement of said rollers, a spring against which said lever works, a ratchet-wheel on said carrier-actuating shaft, a main driving-shaft, a shuttle-shaft intermittently driven by said main shaft, a cam upon said shuttle-shaft, a bell-crank lever, one end resting in said cam, and a pawl which is secured to the other lever-arm, said pawl working in the ratchet-wheel on the carrier-actuating shaft.

12. In a button-hole-barring machine, in combination, a carrier, a block on the under face of the machine, a slot in the bed of the machine through which said block projects and in which it is adapted to move, said carrier being pivoted to said block, a carrier-actuating shaft, disks upon said shaft, rollers equal in number to the longitudinal stitches desired upon said disk in the path of said block, a bell-crank lever, one end connected to said carrier, rollers equal in number to the lateral stitches desired upon said disk, the other end of said lever being in the line of movement of said rollers, a cam upon said disk, substantially as described, covering that portion of the disk corresponding to the portion of the disk upon which the rollers operating the longitudinal stitches are placed, said cam being in the path of movement of the lever connected to the carrier, a ratchet-wheel on said carrier-actuating shaft, a main driving-shaft, a shuttle-shaft intermittently driven by said main shaft, a cam upon said shuttle-shaft, a bell-crank lever, one end resting in said cam, and a pawl which is secured to the other lever-arm, said pawl working in the ratchet-wheel on the carrier-actuating shaft.

13. In a button-hole-barring machine, in combination, a carrier, a block on the under face of the machine, a slot in the bed of the machine through which said block projects and in which it is adapted to move, said carrier being pivoted to said block, a carrier-actuating shaft, disks upon said shaft, rollers equal in number to the longitudinal stitches desired upon said disk in the path of said block, a spring against which said block works, a bell-crank lever, one end connected to said carrier, rollers equal in number to the lateral stitches desired upon said disk, the other end of said lever being in the line of movement of said rollers, a spring against which said lever works, a cam upon said disk, substantially as described, covering that portion of the disk corresponding to the portion of the disk upon which the rollers operating the longitudinal stitches are placed, said cam being in the path of movement of the lever connected to the carrier, a ratchet-wheel on said carrier-actuating shaft, a main driving-shaft, a shuttle-shaft intermittently driven by said main shaft, a cam upon said shuttle-shaft, a bell-crank lever, one end resting in said cam, and a pawl which is secured to the other lever-arm, said pawl working in the ratchet-wheel on the carrier-actuating shaft.

14. In a button-hole-barring machine, in combination, a carrier, a block on the under face of the machine, a slot in the bed of the machine through which said block projects and in which it is adapted to move, said carrier being pivoted to said block, a carrier-actuating shaft, disks upon said shaft, rollers equal in number to the longitudinal stitches desired upon said disk in the path of said block, a bell-crank lever, one end connected to said carrier, rollers equal in number to the lateral stitches desired upon said disk, the other end of said bell-crank lever being curved, as described, and being in the line of movement of said rollers, a cam, substantially as described, upon said disk, said curved end of the lever being in the line of movement of said cam, a ratchet-wheel on said carrier-actuating shaft, a main driving-shaft, a shuttle-shaft intermittently driven by said main shaft, a cam upon said shuttle-shaft, a bell-crank lever, one end resting on said cam, and a pawl which is secured to the other lever-arm, said pawl working in the ratchet-wheel on the carrier-actuating shaft.

15. In combination, a main driving-shaft, an idle pulley on said shaft, a clutch secured upon said shaft so as to be capable of a movement along said shaft, a bifurcated rod encircling said clutch, a carrier, a carrier-actuating shaft, a disk upon said shaft, an inset in said disk, a spring-pressed arm connected to said clutch-rod, a roller upon said arm which travels upon said disk, and stitch-forming mechanism, substantially as described.

16. In combination, stitch-forming mechanism, a carrier, a carrier-actuating shaft, a disk upon said shaft, a recess in said disk, a goods-clamp, a spring-pressed arm connected to the goods-clamp, and a roller on the end of said arm which rests upon said disk.

17. In combination, a main driving-shaft, an idle pulley on said shaft, a clutch secured upon said shaft so as to be capable of a movement along said shaft, a bifurcated rod encircling said clutch, a carrier-actuating shaft, a disk upon said shaft, an inset in said disk, a spring-pressed arm connected to said bifurcated rod, a roller upon said arm which rests upon said disk, a carrier, a goods-clamp connected to said spring-pressed arm carrying the roller, and stitch-forming mechanism.

18. In combination, a main driving-shaft, an idle pulley on said shaft, a clutch secured upon said shaft so as to be capable of a movement along said shaft, a bifurcated rod encircling said clutch, a carrier, a carrier-actuating shaft, a disk upon said shaft, a raised ledge upon said disk, an inset in said ledge, a spring-actuated arm connected to said bifurcated rod, a roller upon said arm which travels upon said ledge, and stitch-forming mechanism, substantially as described.

19. In combination, stitch-forming mechanism, a carrier-actuating shaft, a disk upon said shaft, a raised ledge upon said disk, an inset in said ledge, a carrier, a goods-clamp, a spring-pressed arm connected to the clamp, and a roller on the end of said arm which rests upon said ledge.

20. In combination, a main driving-shaft, an idle pulley on said shaft, a clutch secured upon said shaft so as to be capable of a movement along said shaft, a bifurcated rod encircling said clutch, a carrier-shaft, a disk upon said shaft, a raised ledge upon said disk, an inset in said ledge, a spring-pressed arm connected to said bifurcated rod, a roller upon said arm which travels upon said ledge, a carrier, a goods-clamp connected to said spring-arm, and stitch-forming mechanism.

21. In combination, stitch-forming mechanism, substantially as described, a main driving-shaft, an idle pulley on said shaft, a clutch secured upon said shaft so as to be capable of a movement along said shaft, a bifurcated rod encircling said clutch, a carrier-actuating shaft, a disk upon said shaft, a raised ledge upon said disk, an inset in said ledge, a spring-actuated arm connected to said bifurcated rod, a roller upon said arm which travels upon said ledge, and means, substantially as described, to elevate the arm carrying the roller out of the inset.

22. In combination, a carrier-actuating shaft, a disk upon said shaft, a raised ledge upon said disk, an inset in said ledge, a carrier, a goods-clamp, a spring-pressed arm connected to said clamp, a roller on the end of said arm which rests upon said ledge, and means, substantially as described, to elevate the arm carrying the roller out of the inset.

23. In combination, a main driving-shaft, an idle pulley on said shaft, a clutch secured upon said shaft so as to be capable of a movement along said shaft, a bifurcated rod encircling said clutch, a carrier-actuating shaft, a disk upon said shaft, a raised ledge upon said disk, an inset in said ledge, a spring-pressed arm connected to said bifurcated rod, a roller upon said arm which travels upon said ledge, a carrier, a goods-clamp connected to said spring-pressed arm, and means, substantially as described, to elevate the arm carrying the roller out of the inset.

24. In combination, stitch-forming mechanism, substantially as described, a main driving-shaft, an idle pulley on said shaft, a clutch secured upon said shaft so as to be capable of a movement along the shaft, a bifurcated rod encircling said clutch, a carrier, a carrier-actuating shaft, a disk upon said shaft, a raised ledge upon said disk, an inset in said ledge, a spring-actuated arm connected to said bifurcated rod, a roller upon said arm which travels upon said ledge, a lever fulcrumed at a point between the ends, a rod connected to one end of said lever with the roller-arm, and a rod connecting the other end with a treadle or similar device.

25. In combination, a clutch, carrier-actuating shaft, a disk upon said shaft, a raised ledge upon said disk, an inset in said ledge, a carrier, a goods-clamp, a spring-pressed arm connected to the clamp, a roller on the end of said arm which rests upon said ledge, a lever fulcrumed at a point between its ends, a rod connecting one end of said lever with a roller-arm, and a rod connecting the other end with a treadle or similar device.

26. In combination, a main driving-shaft, an idle pulley on said shaft, a clutch secured upon said shaft so as to be capable of a movement along the shaft, a bifurcated rod encircling the said clutch, a carrier-actuating shaft, a disk upon said shaft, a raised ledge upon said disk, an inset in said ledge, a spring-pressed arm connected to said bifurcated rod, a roller upon said arm which travels upon said ledge, a carrier, a goods-clamp connected to said spring-arm, a lever fulcrumed at a point between its ends, a rod connecting one end of said lever with the roller-arm, and a rod connecting the other end with a treadle or similar device.

27. In combination, stitch-forming mechanism, substantially as described, a main driving-shaft, an idle pulley on said shaft, a clutch secured upon said shaft so as to be capable of a movement along the shaft, a bifurcated rod encircling said clutch, a carrier, a carrier-actuating shaft, a disk upon said shaft, a raised ledge upon said disk, an inset in said ledge, spring-actuating arm connected to said bifurcated rod, a roller upon said arm which travels upon said ledge, and a disk faced with leather or similar material secured to the machine in such position that when the clutch is shifted out of engagement with the pulley it will strike said disk.

28. In combination, a main driving-shaft, an idle pulley on said shaft, a clutch secured upon said shaft so as to be capable of a movement along the shaft, a bifurcated rod encircling said clutch, a carrier-actuating shaft, a disk upon said shaft, a raised ledge upon said disk, an inset in said ledge, a spring-pressed arm connected to said clutch-rod, a roller upon said arm which travels upon said ledge, a carrier, a goods-clamp connected to said spring-pressed arm, and a disk faced with leather or similar material secured to the machine in such position that when the clutch is shifted out of engagement with the pulley it will strike said disk.

In testimony of which invention I have hereunto set my hand.

HENRY P. FEISTER.

Witnesses:
F. A. HARTRANFT,
THOS. JELBARTICE, Jr.